Aug. 12, 1924.
R. A. HENRY
1,505,024
APPARATUS FOR WASHING MINERALS AND OTHER SUBSTANCES
Filed April 14, 1923
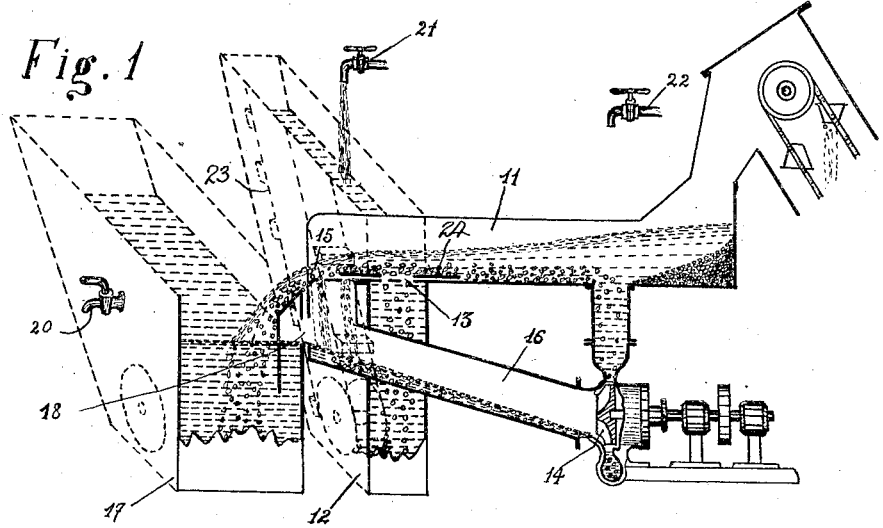
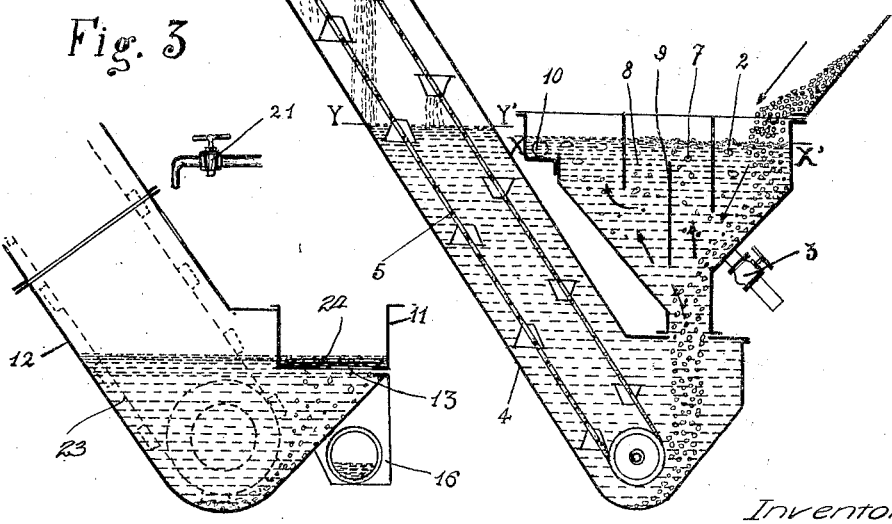
Inventor
R. A. Henry
by Langner, Parry, Card & Langner
Attys.

Patented Aug. 12, 1924.

1,505,024

UNITED STATES PATENT OFFICE.

RENÉ AUGUSTE HENRY, OF LIEGE, BELGIUM.

APPARATUS FOR WASHING MINERALS AND OTHER SUBSTANCES.

Application filed April 14, 1923. Serial No. 632,056.

*To all whom it may concern:*

Be it known that I, RENÉ AUGUSTE HENRY, engineer, a subject of the King of Belgium, and resident of Liege, in the Kingdom of Belgium, have invented certain new and useful Improvements in Apparatus for Washing Minerals and Other Substances; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to the type of apparatus for washing minerals and other substances comprising a trough which is traversed longitudinally by a current of water transporting materials which it classifies by deposition, these substances being carried along in a current circulating in a closed circuit while the less dense substances are removed from the circuit by a separate current.

This current leaving the closed circuit with the above-mentioned substances, entailed a considerable consumption of water.

According to the present invention the above-mentioned consumption of water is avoided in such a manner that all the water used in the depositing apparatus circulates in a closed circuit. With this object the current of water carrying the less dense materials outside of the closed circuit, is led back into the closed circuit after it has been relieved of the materials which it carries.

Other details characteristic of the invention will appear in the description of the accompanying drawings showing one embodiment thereof, and, wherein, Figs. 1 and 2, taken together, represent diagrammatically a view of the washing apparatus.

Fig. 3 represents diagrammatically a section taken through the axis of a tank receiving the treated materials.

According to the constructional form represented in the drawings, the scavenging apparatus receives the crude materials before they pass into the washing apparatus proper.

The crude materials thus discharged at 1, fall into the compartment 2 of a scavenging apparatus which is filled with water up to the level X X'.

The water of the compartment 2 is constantly agitated by means of compressed air led through a passage 3 and directed from the bottom to the top in such a way as to cause an agitation of the water in the said compartment favourable to the disintegration of the aggregate and to the soaking of the particles, making possible their separation under the combined influence of gravity and the resistance of the water. The materials, suitably treated and selected by the agitation of the water, as has been stated above, fall into the compartment 7 where they meet a weak ascending current of water $v$. This current is caused by the difference of level existing between the water levels X X', Y Y' respectively of the scavenging apparatus and of the tank 4 of the chain of buckets 5, under the influence of the flow of water coming from the tap 6. Under the influence of the above-mentioned ascending current $v$, the lighter materials are carried away to the upper part of the compartment 7, since they are not able to descend against the current $v$, except in so much as they adhere to each other, which, however, is substantially prevented by the agitation of the water.

The heavier material on the other hand falls to the bottom of the scavenging apparatus from which the chain of buckets 5 removes it. However, certain particles of material which according to the laws governing the falling of bodies in water, should go to the bottom, are raised by the disturbing eddies created in the compartment 2.

In order to overcome this defect, the material which has reached the top of the compartment 7, passes into the compartment 8 which is free from disturbing eddies, and where it is reached by a weak ascending current $w$ which completes the separation of the materials.

This ascending current $w$ is constituted by a portion of the current $v$ which passes to the left of the water-tight partition 9, separating the two compartments 7 and 8. Under the action of the ascending current the mud escapes through a passage 10 while the scavenged material recovered by a chain of draining buckets 5, is emptied into the washing apparatus proper.

The materials emptied at the upstream end of the trough 11, are sorted out in the latter by deposition under the action of a current of water circulating in a closed circuit. The more dense materials constituting the under layer which rolls on the bottom of the trough, fall into the still water in a tank 12 through the adjustable orfices 13 regulated by the movable plate member 24, and situated in the bottom of the channel and can be recovered therefrom by a chain of draining buckets 23, represented schematically.

The material which is in suspension close to the surface of the water is removed by an overflow 15 situated at the end of the trough 11, while the intermediate material not classified in either of the above-mentioned categories, is carried away by the circulating currents towards the return passage 16 and the centrifugal pump 14 which causes the circulating movement of the closed circuit.

It must be noticed that it is shown on the drawings that the eye of the centrifugal pump which is used to effect the movement of the water and of the material carried by the latter, is only partially submerged in such a way that air also may be drawn in by the pump, thus avoiding the stopping and suction which would be produced if the eye of the pump were completely submerged.

It is also important to draw attention to the fact that by this arrangement a single device only is used in order to ensure both the movement of the water and of the materials.

The separated material and the distinct current which passes over the overflow 15, are received by a reservoir 17 of still water, where the material rapidly reaches the bottom under the influence of gravity and is recovered therefrom by a draining chain (not shown) while the water thus relieved of the materials flows through an overflow passage 18 directly into the head of the return passage 16.

It may be seen that by this arrangement. the water passing over the over-flow 15 and thus leaving the current circulating in the closed circuit, is led back into the latter by means of an over-flow 18 and that accordingly it may be considered that this current is a simple diverted current continuing to circulate in a continuous fashion and with the same intensity in such a way that all of the water used circulates in a closed circuit and only requires a small addition of water sufficient to replace that which is removed, together with the materials by the chain of buckets.

This balance of water may be obtained by a tap 21, whose supply of water also has the function of preventing the formation of a descending current through the orifices 13 under the influence of the removal of the wet materials by the bucket chain.

Further, in order to regulate the level of the water in the reservoir 17 and accordingly in the whole separating installation, as well as the current of water passing through the over-flow 18, two taps have been provided of which one 22 serves to add to and the other 20 to subtract from the water, until the desired level has been obtained.

It is to be noted that the taps 21 and 22 do not both have the same function, for if during a short period, with the object of obtaining a change of regulation in the working of the apparatus, the balance water necessary were too great, it would be impossible to use only the tap 21 for this object without immediately causing an undesirable ascending current through the orifices 13. It is evident that the scavenging device could operate at a different point of the installation, and particularly on the water of the diverted current which falls into the reservoir 17. It is, however, to be noted that the action of a scavenging device is absolutely necessary if it is desired to avoid the choking of the apparatus, and to allow the draining of the products in the chain of draining buckets.

What I claim is:

An improved apparatus for washing and separating minerals and other substances, comprising, a closed circuit structure, including a main trough, a return trough and connecting conduits for the troughs, a plurality of openings in the main trough, one of which openings leads out of the closed circuit structure, and is used for the heavier particles of material, another of which openings leads to the return trough and is used for non-separated material, and another of which openings leads to a settling tank, and is used for the lighter particles together with water, the settling tank having an opening connecting with the return trough for leading said water back to the closed circuit structure solely by gravity.

In testimony whereof I affix my signature in presence of two witnesses.

RENÉ AUGUSTE HENRY.

Witnesses:
YVONNE RIGA,
CHARLES MERCHIL.